(12) United States Patent
Lyons et al.

(10) Patent No.: US 6,793,910 B1
(45) Date of Patent: Sep. 21, 2004

(54) PROCESS TO ACCOMPLISH AUTOTHERMAL OR STEAM REFORMING VIA A RECIPROCATING COMPRESSION DEVICE

(76) Inventors: K. David Lyons, 413 Corona Dr., Morgantown, WV (US) 26508; Robert James, 2325 Miller Ave., Fairmont, WV (US) 26554; David A. Berry, 559 Mt. Morris Rd., Mt. Morris, PA (US) 15349; Todd Gardner, 138 Sun Valley Dr., Morgantown, WV (US) 26508

(*) Notice: Subject to any disclaimer, the term of this patent is extended or adjusted under 35 U.S.C. 154(b) by 169 days.

(21) Appl. No.: 10/261,656

(22) Filed: Oct. 2, 2002

(51) Int. Cl.$^7$ ................................. C01B 3/26
(52) U.S. Cl. ...................... 423/650; 252/373
(58) Field of Search ............... 48/198.1, 198.8; 123/3, 25 R, 25 A, 25 C, 25 E, 25 O, 50 R, DIG. 12; 252/373; 423/650

(56) References Cited

U.S. PATENT DOCUMENTS

| 4,909,192 A | * | 3/1990 | Forster et al. ............ 123/25 C |
| 5,736,116 A | | 4/1998 | LeBlanc et al. |
| 5,992,353 A | * | 11/1999 | Posselt ....................... 123/23 |
| 6,156,234 A | | 12/2000 | Briscoe et al. |
| 6,277,338 B1 | | 8/2001 | Agee et al. |

* cited by examiner

Primary Examiner—Stanley S. Silverman
Assistant Examiner—Maribel Medina
(74) Attorney, Agent, or Firm—Joy A. Alwan; Thomas G. Anderson; Paul A. Gottlieb

(57) ABSTRACT

The invention provides a method and apparatus for producing a synthesis gas from a variety of hydrocarbons. The apparatus (device) consists of a semi-batch, non-constant volume reactor to generate a synthesis gas. While the apparatus feeds mixtures of air, steam, and hydrocarbons into a cylinder where work is performed on the fluid by a piston to adiabatically raise its temperature without heat transfer from an external source.

16 Claims, 4 Drawing Sheets

Intake Stroke of
the Spark Initiated Version
of the Apparatus

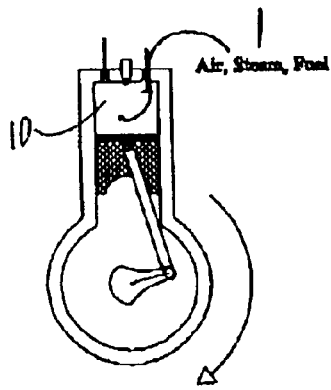

Figure 1. Intake Stroke of the Spark Initiated Version of the Apparatus

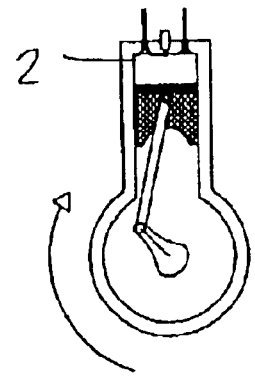

Figure 2. Compression Stroke of the Spark Initiated Version of the Apparatus

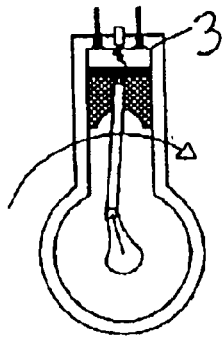

Figure 3. Spark Initiation of Reforming Reactions Near Top Center Piston Position

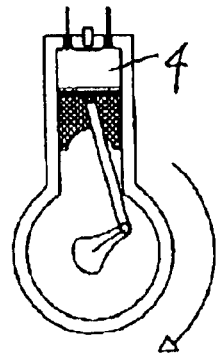

Figure 4. Expansion Stroke of the Spark Initiated Version of the Apparatus

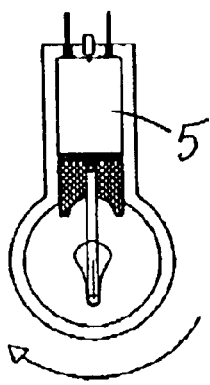

Figure 5. Transition Between the Expansion Stroke and the Exhaust Stroke in the Spark Initiated Version of the Apparatus

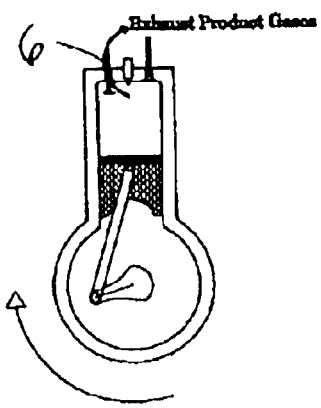

Figure 6. Exhaust Stroke of the Spark Initiated Version of the Apparatus

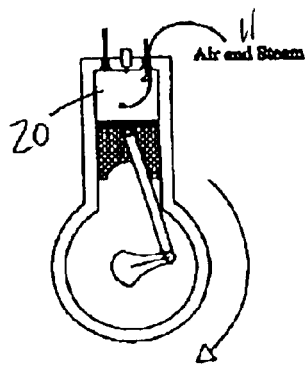

Figure 7. Intake Stroke of the Compression Initiated Version of the Apparatus

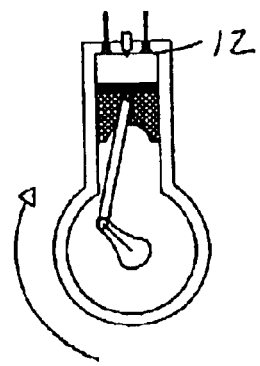

Figure 8. Compression Stroke of the Compression Initiated Version of the Apparatus

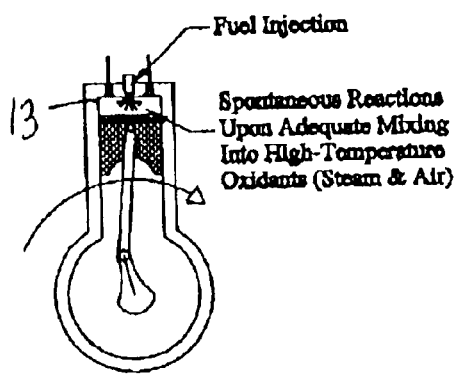

Figure 9. Fuel Injection and Subsequent Commencement of Reforming Reactions

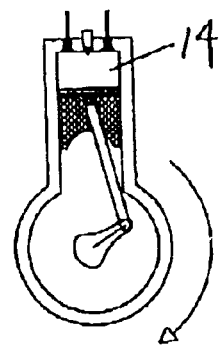

Figure 10. Expansion Stroke of the Compression Initiated Version of the Apparatus

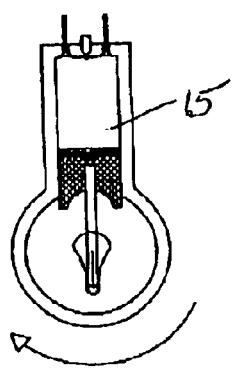

Figure 11. Transition Between the Expansion Stroke and the Exhaust Stroke in the Compression Initiated Version of the Apparatus

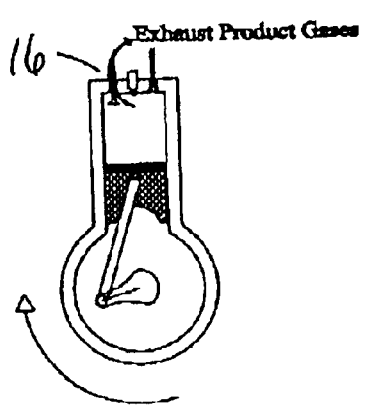

Figure 12. Exhaust Stroke of the Compression Initiated Version of the Apparatus

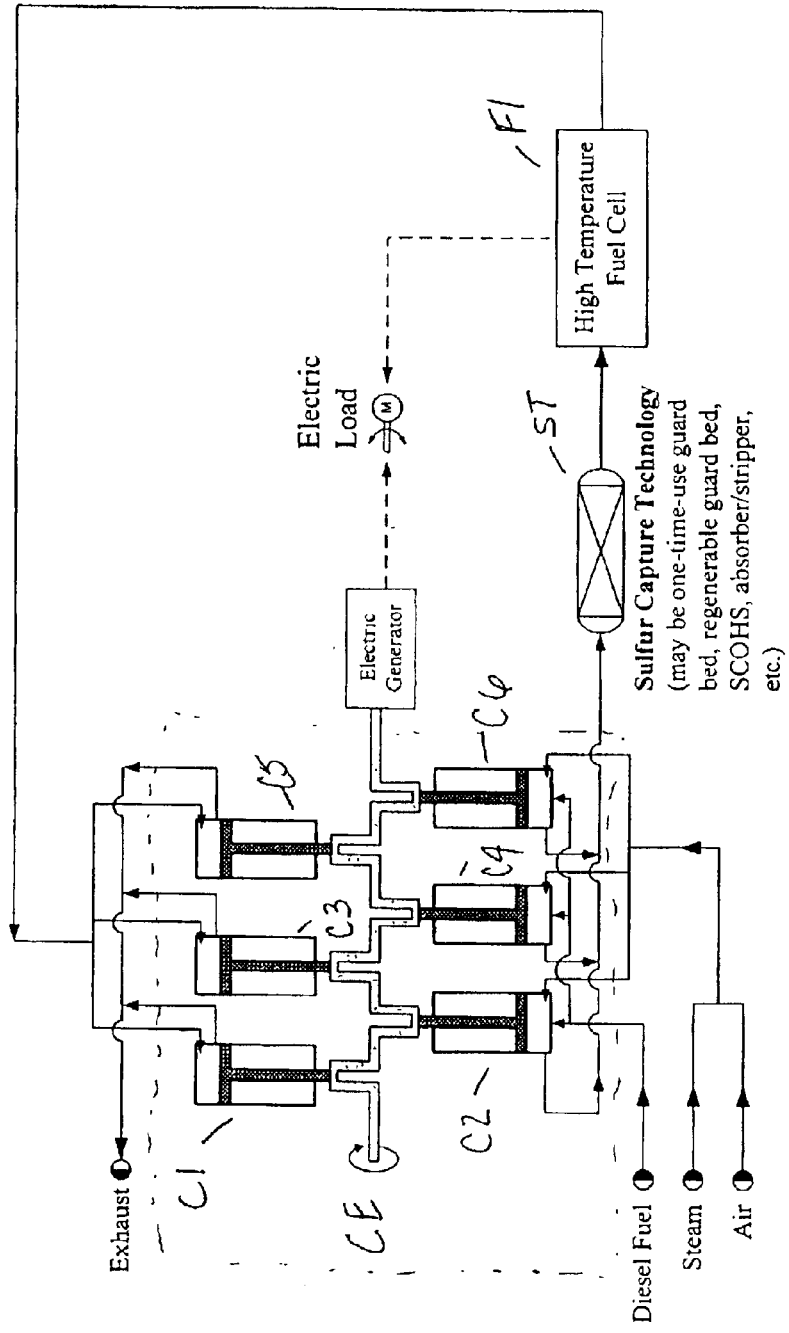
Figure 15  Flowsheet for an Application of the Reciprocating Compression Reformer in a Fuel Cell System Feed with Diesel Fuel
If a mechanical load is desired, a DC motor may be placed on drive shaft in place of the electric generator. The fuel cell would then send power to the motor.

PROCESS TO ACCOMPLISH AUTOTHERMAL OR STEAM REFORMING VIA A RECIPROCATING COMPRESSION DEVICE

CONTRACTUAL ORIGIN OF THE INVENTION

The United States Government has rights in this invention pursuant to an employment relationship between the inventor and the United States Department of Energy.

CROSS REFERENCE TO RELATED APPLICATIONS

Not applicable.

FIELD OF THE INVENTION

The invention relates to a method and apparatus for producing a synthesis gas from a variety of hydrocarbons. This process can be adjusted to provide synthesis gases that are preferentially concentrated with either hydrogen, carbon monoxide, and/or methane. The apparatus (device) consists of a semi-batch, non-constant volume reactor to generate a synthesis gas. The apparatus feeds mixtures of air, steam, and hydrocarbons into a cylinder where work (i.e. compression) is performed on the fluid by a piston to adiabatically raise its temperature without heat transfer from an external source.

BACKGROUND OF THE INVENTION

As predicted by the ideal gas laws, or other applicable equations of state, the temperature of the synthesis gas products will decrease as the volume of the cylinder increases, which is required for work extraction. The raw materials (i.e. air, steam, and hydrocarbon fuel) must be compressed to high temperature to facilitate the necessary reforming reactions. This temperature lowering is thought to be advantageous because many applications using synthesis gas requires a lower temperature than is needed to initiate reforming reactions. Furthermore, a high temperature product often leads to energy losses that cannot be recovered. By allowing the high temperature fluid to generate work, the system recovers energy that might otherwise be wasted.

This process is advantageous with respect to current processes because: (1) It can be started and stopped within seconds, (2) Heat Transfer is not required from external sources, (3) Poisons, such as sulfur, nitrogen, and metals, do not adversely affect the process or equipment, (4) Organic sulfur compounds, such as mercaptans, thiophenes, and poly-ring sulfur-bearing aromatics, are thermally decomposed to hydrogen sulfide, which is easily removed with multiple conventional technologies.

The method's quick start capability shares an advantage with internal combustion engines. However, the method can start and stop much more readily than continuous flow reactor technologies. Being sulfur tolerant, the method also shares this advantage with internal combustion engines. Many catalyst-based systems are poisoned by sulfur (most notably steam reforming systems).

The method's sulfur conversion capabilities out performs other methods such as, Fluidized Catalytic Cracker (FCC) technology for the conversion of complex sulfur compounds into hydrogen sulfide. While the FCC and other Hydrodesulfurization Technologies do this also, these reactor systems cannot co-produce syngas and perform hydrodesulfurization.

Only the internal combustion engines are as small as the apparatus. However, the internal combustion engines cannot perform the desired reactions for syngas production.

The method and apparatus reduce the need for capital equipment. Since high temperatures are generated from compression and lower temperatures are achieved via expansion (work recovery), there is no need for heat transfer equipment. This aspect reduces cost, size, and operating complexity.

The method allows for co-production of chemical product and mechanical work. The method can be controlled to produce 100% work at desired parts of the duty-cycle. Similarly, the method maximizes syngas production at other parts of the duty cycle.

SUMMARY OF THE INVENTION

The invention provides a method and apparatus for producing a synthesis gas from a variety of hydrocarbons. The apparatus (device) consists of a semi-batch, non-constant volume reactor to generate a synthesis gas. The apparatus feeds mixtures of air, steam, and hydrocarbons into a cylinder where work is performed on the fluid by a piston to adiabatically raise its temperature without heat transfer from an external source.

It is an objective of the method to produce synthesis gas without the use of heat transfer.

Another objective of the method is to convert sulfur into hydrogen sulfide.

It is another objective of the method to provide a quick start and stopping procedure for producing synthesis gas.

It is an object of the method to co-produce chemical product and mechanical work.

It is an object of the apparatus to process methane into a synthesis gas.

Finally, it is an object of the apparatus to reduce the size and cost in the production of synthesis gas products.

BRIEF DESCRIPTION OF THE DRAWINGS

The accompanying drawings, which are incorporated in and form part of the specification, illustrate an embodiment of the present invention and together with the description, serve to explain the principles of the invention. In the drawings:

FIGS. 1–6. show a detail of six positions of a Spark Initiated Compression Reformer Cycle;

FIGS. 7–12. show a detail of six positions of a Compression Initiated version of the Reciprocating Compression Reformer Cycle;

FIG. 15 shows another embodiment of the invention.

DETAILED DESCRIPTION OF THE INVENTION

Figure 13:
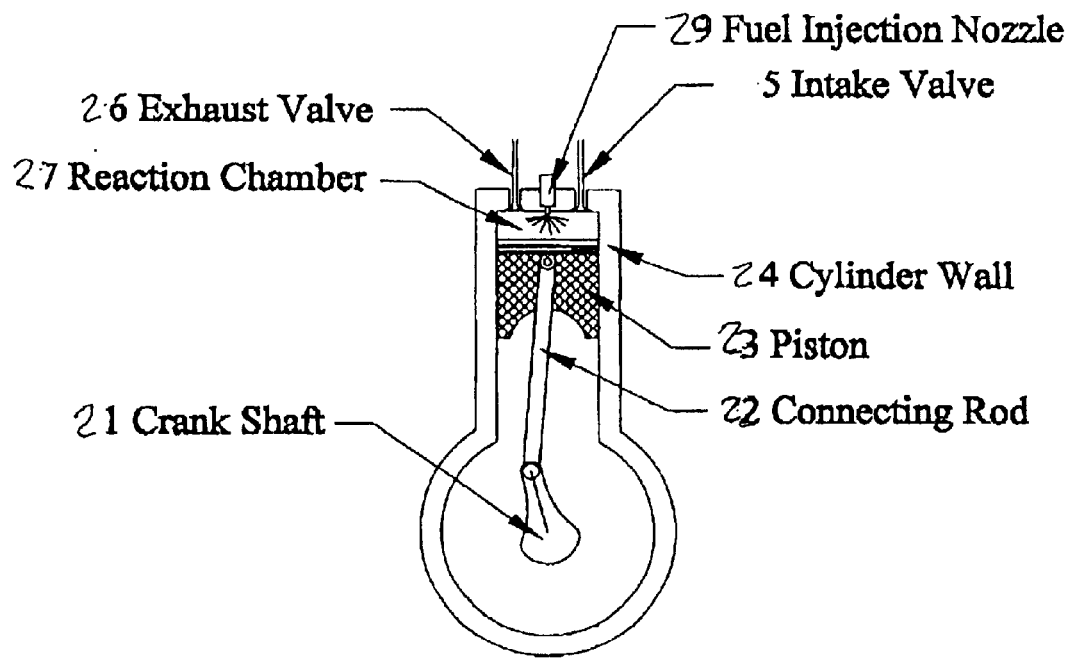
FIGS. 13 and 14 show a detail of the reactor.
Figure 14:
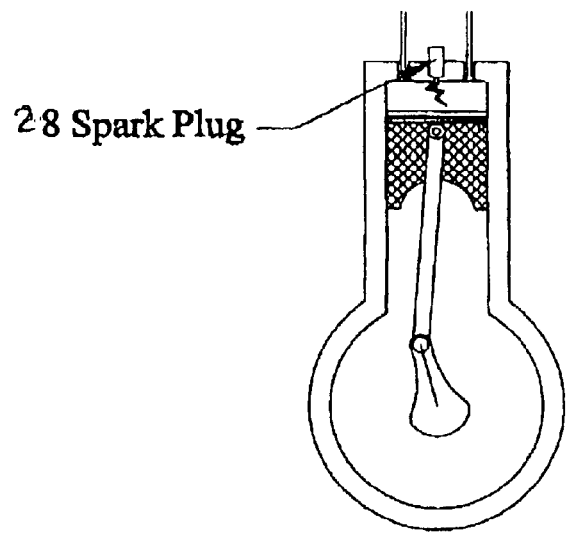

The invention provides a process of producing a synthesis gas from a variety of hydrocarbons. This process can be adjusted to provide synthesis gases that are preferentially concentrated with hydrogen, carbon monoxide, and/or methane. The process is advantageous with respect to current processes because: (1) It can be started and stopped within seconds, (2) heat transfer is not required from external sources, (3) Poisons, such as sulfur, nitrogen, and metals, do not adversely affect the process or equipment, (4) Organic sulfur compounds, such as mercaptans, thiophenes, and poly-ring sulfur-bearing aromatics, are thermally decomposed to hydrogen sulfide, which is easily removed with multiple conventional technologies.

The apparatus (device) consists of a semi-batch, non-constant volume reactor that generates a synthesis gas. The apparatus is utilized in the method that feeds mixtures of air, steam, and hydrocarbons into a cylinder where work (i.e. compression) is performed on the fluid by a piston to adiabatically raise its temperature without heat transfer from an external source. The device may be chosen (or be designed) to operate in one of two modes: (1) Spark Ignition Mode, or (2) Compression Ignition Mode.

In spark ignition mode, the fuel is introduced into the cylinder in a vapor form (implying that either a gaseous fuel is used, or that a liquid fuel is evaporated into the steam and/or air). After the piston compresses the air/steam/fuel mixture to a point near its peak pressure, a spark is used to initiate the "reforming reactions". For the purposes of this disclosure, "reforming reactions" are intended to refer to the system of chemical reactions as shown in Chart 1.

CHART 1

| | |
|---|---|
| $CnHm + n/2\ O_2 \rightarrow n\ CO + m/2\ H_2$ | (often referred to as partial oxidation) |
| $CnHm + (n+m/4)\ O_2 \rightarrow n\ CO_2 + m/2\ H_2O$ | (Combustion Reaction) |
| $H_2 + 0.5\ O_2 \rightarrow H_2O$ | (Combustion Reaction) |
| $CO + 0.5\ O_2 \rightarrow CO_2$ | (Combustion Reaction) |
| $H_2O + CO \leftrightarrow CO_2 + H_2$ | (often referred to as forward and reverse water gas shift) |
| $n\ H_2O + CnHm \rightarrow n\ CO + (n+m/2)\ H_2$ | (often referred to as steam reforming) |
| $CO + 3\ H_2 \rightarrow CH_4 + H_2O$ | (often referred to as methanation) |

Although the combustion reactions listed Chart 1 are important initiators and can provide large amounts of released thermal energy, the addition of oxygen to this process is typically restricted so that an oxygen mass balance inhibits these combustion reactions. The addition of excess steam (H2O) is done to enhance the hydrogen (H2) yield via the steam reforming reaction. The addition of generous amounts of steam is also beneficial as a coke (i.e. solid carbon, or soot) inhibitor.

Synthesis gas products are produced almost immediately after the spark initiation has commenced. The cylinder pressure, already being at or near a peak, may rise further because the number of vapor-phase moles has increased in a near-constant volume chamber. (The volume is considered near constant because the reactions are thought to be so instantaneous that the piston does not have enough time to move substantially.) The exact result of this production is highly sensitive to the reactant feed ratios (i.e. ratio of steam to oxygen (or air) to fuel). This process is also sensitive to the nature of the fuel, specifically the carbon to hydrogen to oxygen atom ratio in a representative fuel molecule. As the reactions progress to completion, the high temperature, high-pressure gases push the piston down to form the expansion stroke, allowing the device to recover work that has been performed on the fluid during the compression stroke. It is during this phase that this device is employed as a hybrid power device. After the expansion stroke is complete, the motion of the piston reverses as the exhaust valve opens. The piston motion flushes most of the synthesis gas from the cylinder during this exhaust stroke. When the piston movement reverses once more, the exhaust valve closes, the intake valve opens, and the piston moves to the bottom point of the cylinder. The piston motion facilitates the flow of steam, air, and evaporated (or gaseous) fuel to move into the cylinder. At this point, the previously described compression stroke occurs as the cycle repeats itself indefinitely.

Depending on the air (or oxygen) concentration delivered to the apparatus, the Reciprocating Compression Reformer may provide mechanical power, require mechanical addition of mechanical power, or provide no net power gain or loss. However, selecting one of these operating modes has a profound affect on the quality of the synthesis gas product. These aspects are demonstrated in the following examples:

EXAMPLE 1

Compression Initiated Reforming of Diesel Fuel (DF2) and Co-production of Mechanical Power A single cylinder version of the apparatus having a 4.5" bore and 7" clearance height at bottom center will be utilized to generate a methane-rich synthesis gas. The approximate chemical composition of this synthesis gas product is shown in Chart 2.

CHART 2

| Gas Component | Concentration (wet basis) | Concentration (dry basis) |
|---|---|---|
| Methane, $CH_4$ | 37.1% | 57.9% |
| Carbon monoxide, CO | 0.8% | 1.2% |
| Hydrogen, $H_2$ | 4.6% | 7.2% |
| Water, $H_2O$ | 21.6% | n/a |
| Contaminants ($H_2S$, $NH_3$, etc.) | ≈0.1% | ≈0.1% |
| Inerts (e.g. $N_2$, $CO_2$, etc.) | Balance | Balance |

To produce such a product gas with the device described in this example, the cylinder is filled with a mixture of steam and air (63 mole percent $H_2O$) at low pressure (essentially ambient pressure). Such filling will be accomplished through the intake valve as the piston is drawn toward bottom center. When the piston achieves its target position at bottom center, the intake valve is closed. As the intake valve closes, the piston is pushed toward top center with the assistance of inputting mechanical work. The laws of thermodynamics predict that the steam/air fluid mixture will rise in both temperature and pressure. If a top clearance height of approximately 0.29" is achieved, then a fluid pressure of 64 atmospheres and a temperature of 1073° K are produced. When the steam/air mixture achieves this peak temperature/pressure combination, 0.58 grams of diesel fuel is introduced into the cylinder via a conventional atomizing fuel injector nozzle. Compensation for time delay of fuel injection and evaporation may require the fuel injection process to occur slightly before the peak temperature/pressure is achieved in the steam/air mixture.

After the diesel fuel is injected into the cylinder, the piston is allowed to return to its bottom center position. Work is extracted from the device during this expansion. The time required for expansion also allows the Reforming Reactions to achieve completion. Once the product gases have fully expanded, as indicated by the piston's placement at the bottom center position, the exhaust valve opens. The product gases are evacuated from the cylinder as the piston is again brought to top center. When the cylinder is nearly empty (as indicated by the piston's placement at top center and the open status of the exhaust valve), the exhaust valve is closed and the intake valve is opened. The piston starts another cycle of the process by drawing in more steam and air and repeating the steps described above.

An optional shaft and flywheel may be added to the device if a constant power output is desired. Such an arrangement will co-produce 8 kW of mechanical work in this example if the entire 4-stroke cycle is repeated at a rate of 16 Hz.

EXAMPLE 2

Compression Initiated Reforming of Diesel Fuel (DF2) Requiring Additional Input of Mechanical Power A single cylinder version of the apparatus having a 4.5" bore and 7" clearance height at bottom center will be utilized to generate a methane-rich synthesis gas. The approximate chemical composition of the synthesis gas product is shown in Chart 3.

CHART 3

| Gas Component | Concentration (wet basis) | Concentration (dry basis) |
|---|---|---|
| Methane, $CH_4$ | 38.0% | 61.3% |
| Carbon monoxide, CO | 1.4% | 2.3% |
| Hydrogen, $H_2$ | 7.7% | 12.4% |
| Water, $H_2O$ | 38.0% | n/a |
| Contaminants ($H_2S$, $NH_3$, etc.) | ≈0.1% | ≈0.1% |
| inerts (e.g. $N_2$, $CO_2$, etc.) | Balance | Balance |

To produce such a product gas with the device described in this example, the cylinder is filled with steam, mixed with a small amount of air (97 mole percent $H_2O$) at low pressure (essentially ambient pressure). Such filling will be accomplished through the intake valve, as described in Example 1. Fluid compression is also carried out as was described in Example 1. A much smaller top clearance height of approximately 0.11" is achieved. This high degree of compression results in fluid pressure of about 200 atmospheres and a temperature of 1273° K, as predicted by isentropic thermodynamic calculations. When the steam/air mixture achieves this peak temperature/pressure combination, 0.62 grams of diesel fuel (0.2 wt% S) is introduced into the cylinder via a conventional atomizing fuel injector nozzle.

After the diesel fuel is injected into the cylinder, the piston is allowed to return to its bottom center position. Work is extracted from the device during this expansion. The time required for expansion also allows the Reforming Reactions to achieve completion. In addition to the Reforming Reactions, the sulfur impurity present in the fuel is converted to $H_2S$. The $H_2S$ can easily be separated from the product gas after exhausted from the apparatus via conventional guard bed technology.

After the product gases have fully expanded, as indicated by the piston's placement at the bottom center position, the exhaust valve opens. The product gases are evacuated from the cylinder as the piston is again brought to top center. When the cylinder is nearly empty (as indicated by the piston's placement at top center and the open status of the exhaust valve), the exhaust valve is closed and the intake valve is opened. The piston starts another cycle of the process by drawing in more steam and air and repeating the steps described above.

An optional shaft and flywheel may be added to the device if a constant power input is desired. Such an arrangement will require a uniform 23 kW of mechanical work to be input into the device for this example if the entire 4-stroke cycle is repeated at a rate of 16 Hz.

EXAMPLE 3
Design of a "Work Neutral" Device

If the designer's goal is to maximize hydrogen and carbon monoxide yield without having a net input of mechanical work, then a combination of cylinders described in Examples 1 and 2 can be utilized in a single device. In this arrangement, 3 cylinders operating as described in Example 1 can be combined with 1 cylinder operating as described in Example 2.

The four cylinders described above can be designed and constructed according to the well-established techniques of the current art of internal combustion engine design and manufacture.

If each of these four cylinders were operated as described in Examples 1 and 2, such that the entire synthesis gas generation steps would repeat at a frequency of 16 Hz, then a net power output of approximately 3 kW would be available. However, this power output would most likely be needed to overcome frictional losses and auxiliary equipment power consumption. If the four-cylinder device illustrated in this example were operated at the stated frequency. As shown in Chart 4 the following product gas flow rate (dry basis) could be expected (sum of all four cylinders).

CHART 4

| Methane | 2500 scfh |
|---|---|
| Carbon Monoxide | 68 scfh |
| Carbon Dioxide | 995 scfh |
| Hydrogen | 375 scfh |
| Hydrogen Sulfide | trace |
| Ammonia | trace |
| Nitrogen | 954 scfh |

EXAMPLE 4
Spark Initiated Reforming of Methane and Co-production of Mechanical Power A single cylinder version of the apparatus having the same dimensions described in Examples 1 and 2 (4.5" bore and 7" clearance height at bottom center) is utilized to generate a hydrogen and carbon monoxide-rich synthesis gas from a methane fuel source. The approximate chemical composition (wet basis) of this synthesis gas product is shown in Chart 5.

CHART 5

| Gas Component | Concentration (wet basis) | Concentration (dry basis) |
|---|---|---|
| Methane, $CH_4$ | 1.2% | 1.4% |
| Carbon monoxide, CO | 14.7% | 16.6% |
| Hydrogen, $H_2$ | 32.1% | 36.3% |
| Water, $H_2O$ | 11.5% | n/a |
| Contaminants ($H_2S$, $NH_3$, etc.) | ≈0.1% | ≈0.1% |
| Inerts (e.g. $N_2$, $CO_2$, etc.) | Balance | Balance |

Unlike the Compression-Initialed Reforming version of this device, the Spark-Initiated Reforming version will feed fuel as well as steam and air into the cylinder during the intake stroke. To produce such a product gas with the device described in this example, the cylinder is filled with the feed mixture resulting in the following initial concentrations: 13.3 mol % steam, 23.6 mol % methane, and air occupying the balance. Like the previous examples, this feed mixture will be at low pressure (essentially ambient pressure). Such filling will be accomplished through the intake valve, and a dedicated fuel injection nozzle (for safety reasons), as the piston is drawn toward bottom center. When the piston achieves its target position at bottom center, the intake valve(s) are closed. As the intake valve closes, the piston is pushed toward top center with the assistance of inputting mechanical work. The laws of thermodynamics predict that the steam/air/fuel fluid mixture will rise in both temperature and pressure. Since methane is a relatively "high-octane rated" fuel, it is not prone to pre-ignition (i.e. knocking) and will not react during the compression stage of the device's operation.

Once a top clearance height of approximately 0.8" is achieved, then a fluid pressure of 23.5 atmospheres and a temperature of 1073° K are produced. When the steam/air/fuel mixture achieves this peak temperature/pressure combination, an electric discharge (i.e. spark) is introduced into the cylinder for the purpose of introducing localized energy into the fluid mixture that will exceed the activation energy for methane to react with primarily air, and subsequently steam. At the high temperature of the cylinder at this stage of operation, methane's reaction with steam and air will progress quickly, once initiated by the spark.

As the fuel/steam/air mixture reacts to form synthesis gas (hydrogen and carbon oxides) the high pressure, high temperature fluid is allowed to expand by pushing the piston towards bottom center. Work is extracted from the device. The time required for expansion allows the Reforming Reactions to achieve completion. The expansion also allows the product gases to achieve a lower temperature, as dictated by the Laws of Thermodynamics.

Similar to the operation described in the previous examples, the product gases are evacuated from the cylinder after they have fully expanded. Once this condition is reached, the exhaust valve opens and the product gases leave the device as the piston is again brought to top center. When the cylinder is nearly empty (as indicated by the piston's placement at top center and the open status of the exhaust valve), the exhaust valve is closed and the intake valve is opened. The piston starts another cycle of the process by drawing in more steam and air and repeating the steps described above. An optional shaft and flywheel may be added to the device if a constant power output is desired. Such an arrangement will co-produce 11.2 kW of mechanical work in this example if the cycle is repeated at a rate of 16 Hz.

EXAMPLE 5
Spark Initiated Reforming of Methane with Net Input of Mechanical Power A single cylinder version of the apparatus having the same dimensions described in Examples 1 through 4 (4.5" bore and 7" clearance height at bottom center) will be utilized to generate a hydrogen and carbon monoxide-rich synthesis gas from a methane fuel source. The approximate chemical composition of this synthesis gas product are shown in Chart 6:

CHART 6

| Gas Component | Concentration (wet basis) | Concentration (dry basis) |
| --- | --- | --- |
| Methane, $CH_4$ | 2.8% | 6.2% |
| Carbon monoxide, CO | 4.5% | 10.0% |
| Hydrogen, $H_2$ | 33.0% | 73.0% |
| Water, $H_2O$ | 54.8% | n/a |
| Contaminants ($H_2S$, $NH_3$, etc.) | <0.1% | <0.1% |
| Inerts (e.g. $N_2$, $CO_2$, etc.) | Balance | Balance |

Like the previous example, operation of this Spark-Initiated Reforming device will feed fuel as well as oxidant into the cylinder during the intake stroke. However, air is not needed as an oxidant in this example. To produce a product gas similar to that described in the table above, the cylinder will initially be filled with the feed mixture resulting in the following initial concentrations: 85 mol % steam and 15 mol % methane. Like the previous examples, this feed mixture will be at low pressure (essentially ambient pressure). Such filling will be accomplished through the intake valve, and perhaps a dedicated fuel injection nozzle (for safety reasons), as the piston is drawn toward bottom center. When the piston achieves its target position at bottom center, the intake valve(s) are closed. As the intake valve closes, the piston is pushed toward top center with the assistance of inputting mechanical work. The laws of thermodynamics predict that the steam/fuel fluid mixture will rise in both temperature and pressure. After enough compression is supplied to elevate the temperature of the mixture high enough to make steam cracking of methane favorable, that endothermic reaction will tend to limit further temperature increases. Additional compression past this point will provide additional hydrogen yield instead of additional temperature increases. Spark initiation is not likely to be needed.

If a very tight top clearance height of approximately 0.07" is achieved, then isentropic thermodynamic calculations predict a fluid pressure of 375 atmospheres and a temperature of 1248° K will be achieved at top center with the gas chemistry reported at the beginning of this example. (As a side note, a temperature of 1673° K, and pressure of 418 atmospheres are predicted by isentropic compression calculations. However, such a result is unrealistic since it does not account for chemical reactions, which are certain to occur at temperatures exceeding 1220° K. The temperature/pressure results reported in this example reflect chemical equilibrium and heat balance considerations from the 1673° K baseline).

When the steam/fuel mixture achieves this peak temperature/pressure combination, the chemical reactions are thought to be essentially complete. This is a unique aspect of this example, compared to the previous examples where the fuel chemistry is in a transition during the expansion stroke.

As the product gases expand and push the piston towards bottom center, work is extracted from the device. This quantity of work helps offset the relatively large need to input work into the compression stroke. The expansion of these gases also allows the product gases to achieve a lower temperature, as dictated by the Laws of Thermodynamics.

Similar to the operation described in the previous examples, the product gases are evacuated from the cylinder after they have fully expanded, as indicated by the piston's placement at the bottom center position. Once this condition is reached, the exhaust valve opens and the product gases leave the device as the piston is again brought to top center. When the cylinder is nearly empty (as indicated by the piston's placement at top center AND the open status of the exhaust valve), the exhaust valve is closed and the intake valve is opened. The piston starts another cycle of the process by drawing in more steam and fuel, and repeating the steps described above.

An optional shaft and flywheel may be added to the device if a constant power output is desired. Such an arrangement will consume 5.9 kW of mechanical work in this example, if the entire 4-stroke cycle is repeated at a rate of 16 Hz.

EXAMPLE 6
Application of the Reciprocating Compression Reformer in a Sulfur-Intolerant Fuel Cell System Feed with Diesel Fuel A flowsheet for this application is shown in FIG. 15. In this example, the reciprocating compression reformer has several cylinders (C1–C6) that produce synthesis gas from diesel fuel, steam, and air. The synthesis gas is decontaminated with a sulfur capture technology (ST) and is then sent to a fuel cell (F1). The fuel utilization of the fuel cell (F1) is always less than 100%, and is typically on the order of 85%. The unutilized fuel, along with the oxidized fuel products, is sent to dedicated cylinders in the reciprocating compression reformer that act solely as a heat engine. These cylinders (C1–C6) are essentially an internal combustion engine (CE) that produced mechanical power.

At system startup, when all of the components are cold, all cylinders (C1–C6) in the reciprocating compression device are operated in heat engine mode. This is done to provide instant power output from the system and to provide a means of warming the fuel cell components. This requires that the steam flow into the system be set to zero flow. Since combustion, rather than reforming, is occurring in the "front end" cylinders, hot gases (i.e. combustion exhaust) are circulated through the fuel cell (F1) and any catalyst beds that may be present. A control system would gradually shift the "front end" cylinders from combustion mode to reforming mode, probably by controlling the steam injection rate, as the fuel cell (F1) comes on-line. However, the system user would not be aware of this transition since the system would continuously delivery power as required.

This example demonstrates how this concept could be used in many transportation applications. Diesel fuel is illustrated in this example however, the concept and this application is not fuel specific. Gasoline, natural gas, and many other fuels could be used to accomplish the same goals.

EXAMPLE 7

Application of the Reciprocating Compression Reformer in a Carbon Monoxide and/or Carbon Dioxide-Intolerant Fuel Cell System Feed with Diesel Fuel This example is very similar to Example 6, except that it illustrates how this technology may be utilized with low temperature fuel cell technologies, especially those fuel cell technologies that are particularly susceptible to carbon monoxide poisoning (PEMFC, AFC, etc.). The mass flows and system startup described in Example 6 would also be used here. The major difference is that a hydrogen membrane would be utilized to separate hydrogen from the synthesis gas. This purified hydrogen would be utilized in the fuel cell. The unused hydrogen and unrecovered fuel from the synthesis gas (hydrogen, carbon monoxide, methane, etc.) would be used in the combustion cylinders of the reciprocating compression device. The claims and advantages listed in Example 6 remain valid for this example.

PREFERRED EMBODIMENT

In operation, the spark-initiated version of the invention can be used to transform hydrocarbon fuel(s) into a hydrogen gas and carbon monoxide mixture that is suitable for operating fuel cell technologies and/or synthetic fuels production plant. As shown in FIGS. 1–6 a mixture of steam and methane is introduced into the chamber (10) during the intake stroke (1). The mixture is compressed (2) to more than 400 atmospheres, providing an isentropic temperature of 1673 degree Celsius. At this temperature the steam reforming reactions occur readily. A spark (3) is introduced to initiate the reforming reactions. The expansion stroke (4) allows the synthesis gas to expand the control volume to maximum (5). It is assumed that the product chemistry of the exhaust (6) can be approximated by equilibrium calculations performed using a temperature over 945 degree Celsius, corresponding to a constant-volume, adiabatic chemical reaction equilibrium temperature. At a steam; methane ratio of 5.66:1.0 introduced on the intake stroke (1), a nitrogen free exhaust product (6) would be produced at a rate of 20.7 Nm3/hr, at a temperature of near or below dew point of the gas. This is the result of net-work input of 5.9 kilowatts, delivered by a rotating shaft at 1000 revolutions per minute (RPM). Chart 2 shows detailed calculations of the method.

The compression-initiated version of this device would function similarly to the spark-initiated version. The major difference is that the fuel would not be introduced during the intake stroke, although the steam and/or air would be. After the steam and air participate in the compression stroke, the high-pressure liquid fuel would be injected into the high temperature, high-pressure Reaction Chamber (20). The device is designed so that the conditions at this point meet the minimum requirements for the fuel to instantly react with the steam and air that is already present in the Reaction Chamber (20). The reactions and operations that take place for the remainder of the compression-initiated version of this process/device are identical to the spark-initiated version.

In operation, the Compression Initiated version of the apparatus converts hydrocarbons such as Diesel Fuel (DF2) into a feed suitable for Solid Oxide Fuel Cells, with the Input of External Power. The following example, illustrated in FIGS. 7–12, indicate how the compression-initiated version of this invention is used to transform conventionally available diesel fuel into a hydrogen/carbon monoxide/methane mixture which is suitable for operating a solid oxide fuel cell. In this example, a mixture of steam and air, predominately being steam, is introduced into the Reaction Chamber (20) during the intake stroke (11). The air and steam is compressed during the Compression Stroke (12) to very high pressures, providing an isentropic temperature high enough for the fuel to become highly reactive. Unique to the Compression Initiated version of the apparatus, fuel is injected into the Reaction Chamber (20) when the piston is near the top-center position of the compression stroke (13). The amount of fuel injected is chosen so that atom ratio of C:H:O for all of the chemical components in the cylinder corresponds to the desired synthesis gas product composition. Heat balance considerations must also be taken into account when specifying this ratio. The Expansion Stroke (14) allows the synthesis gas to expand as the piston (23) moves toward bottom center (T3) and Maximum Chamber Volume is achieved. After this volume is achieved, the Exhaust Valve (26) is opened and the Exhaust Stroke (16) begins. This Exhaust Stroke (16) ends when the piston (23) approaches Top Center and Minimum Chamber Volume is achieved. When Minimum Chamber Volume is achieved, the Exhaust Valve (26) is closed and the Intake Valve (25) is opened, so that the Intake Stroke (11) may begin for the next cycle. These actions repeat themselves indefinitely until terminated by the device operator or control system.

During the specific device design, the product chemistry of the Exhaust Stroke (16) is approximated by chemical equilibrium calculations (Gibbs Free Energy Minimization techniques with adiabatic system constraints). The calculated temperature must be sufficiently high enough to facilitate the desired reactions. Typically, a mean temperature is not selected for the chemical equilibrium calculations since the peak temperature is already relatively low, indicating that further reactions at lower temperatures are likely to be too slow to occur in this device.

This example illustrates that sulfur, introduced with the fuel as and undesirable contaminant can be converted to hydrogen sulfide, which is easily removed by a variety of established technologies.

The air to steam ratio can be adjusted to control the temperature, and tailor the composition of the syngas. The dimensions of the cylinder (i.e. Reaction Chamber) are not critical for the thermodynamics of the process, but serve only as a means of scaling the device for the desired product gas flow rate. It is anticipated that the compression-initiated process will be preferentially used for fuels with favorable auto-ignition characteristics (i.e. traditional diesel fuels).

As predicted by the ideal gas laws, or other applicable equations of state, the temperature of the synthesis gas products will decrease as the volume of the cylinder (closed system) increases, which is required for work extraction. This temperature lowering is thought to be advantageous because many applications using synthesis gas requires a lower temperature. Furthermore, a high temperature product often leads to energy losses, via undesirable heat transfer from high temperature sources that cannot be recovered. By allowing the high temperature fluid to generate work, the system recovers energy that might otherwise be wasted.

The invention has been described in detail with particular reference to certain preferred embodiments thereof, but it will be understood that variations and modifications can be effected within the spirit and scope of the invention.

PARTS LIST

1. Intake Stroke
2. Compression Stroke
3. Spark Ignition
4. Expansion Stroke
5. Expansion at Maximum Chamber Volume
6. Exhaust
10. Piston Chamber
11. Intake Stroke
12. Compression Stroke
13. Fuel Injection Compression
14. Expansion Stroke
15. Expansion at Maximum Volume
16. Exhaust
20. Piston Chamber
21. Crank Shaft
22. Connecting Rod
23. Piston
24. Cylinder Wall
25. Intake Valve
26. Exhaust Valve
27. Reaction Chamber
28. Spark Plug The embodiments of the invention in which an exclusive property or privilege is claimed are defined as follows:

1. A process of producing a synthesis gas product comprising the steps of:
    introducing steam and a hydrocarbon mixture into a reactor;
    compressing said steam and hydrocarbon mixture;
    raising the temperature of said steam and hydrocarbon mixture;
    spark ignition of said steam and hydrocarbon gas mixture to facilitate creation of a synthesis gas product;
    expanding said synthesis gas product; and
    exhausting the synthesis gas product.

2. The process as recited in claim 1 wherein said reactor is a piston cylinder arrangement.

3. The process as recited in claim 2 wherein said step of raising the temperature of said steam and hydrocarbon mixture is an isentropic process.

4. The process as recited in claim 3 wherein said step of spark ignition initiates a reformer reaction.

5. The process as recited in claim 4 wherein said step of compressing said steam and hydrocarbon mixture compresses the mixture to achieve a temperature of at least 8000 Celsius.

6. The process as recited in claim 5 wherein said hydrocarbon is a natural gas and the steam and natural gas mixture have a volume ratio of 5.66:1.0.

7. The process as recited in claim 6 wherein said natural gas is 100% methane.

8. The process as recited in claim 2 wherein said hydrocarbon is any petroleum product or by-product.

9. The process as recited in claim 2 wherein said step of exhausting the synthesis gas product produces a nitrogen free exhaust product.

10. A method of converting a hydrocarbon fuel into a hydrogen/carbon monoxide/methane mixture which is suitable for operating a solid oxide fuel cell comprising the steps of:
    introducing air and steam into a reactor;
    compressing said air and steam;
    injecting hydrocarbon fuel into said compressed air and steam;
    raising the temperature;
    creating a synthesis gas product;
    expanding said synthesis gas product; and
    exhausting the synthesis gas product.

11. The method as recited in claim 10 wherein said reactor is piston cylinder arrangement.

12. The method as recited in claim 10 wherein said step of raising the temperature of said synthesis gas product is an isentropic process.

13. The method as recited in claim 11 wherein said fuel is a diesel fuel.

14. The method as recited in claim 12 wherein said step of compressing the air and steam mixture compresses the mixture to achieve a temperature of at least 8000 Celsius.

15. The method as recited in claim 13 wherein said air and steam has an initial ratio of 1.68:1.0.

16. The method as recited in claim 14 wherein said step of exhausting the synthesis gas product produces a synthesis gas product at a rate of 40.2 $Nm^3/hr$.

* * * * *